US006037965A

United States Patent [19]
Gross et al.

[11] Patent Number: 6,037,965
[45] Date of Patent: Mar. 14, 2000

[54] METHOD AND APPARATUS FOR DELIVERING LASER ENERGY TO AN OBJECT

[75] Inventors: Abraham Gross; Boris Kling, both of Rehovot, Israel

[73] Assignee: Orbotech LTD, Yavne, Israel

[21] Appl. No.: 08/742,887

[22] Filed: Nov. 1, 1996

[30] Foreign Application Priority Data

Nov. 2, 1995 [IL] Israel ........................................ 115864

[51] Int. Cl.$^7$ .................................................. G02B 26/08
[52] U.S. Cl. .......................... 347/241; 347/238; 347/256; 359/495; 359/503
[58] Field of Search .................................. 347/238, 239, 347/241, 243, 244, 256; 359/204, 503, 495

[56] References Cited

U.S. PATENT DOCUMENTS

| | | | |
|---|---|---|---|
| 3,794,412 | 2/1974 | Hill | 359/25 |
| 4,201,455 | 5/1980 | Vadasz | 350/358 |
| 4,516,838 | 5/1985 | Bademian | 350/358 |
| 4,520,047 | 5/1985 | Hillenmanns | 427/331 |
| 4,520,472 | 5/1985 | Reno | 369/112 |
| 4,540,245 | 9/1985 | Bademian | 350/358 |
| 4,560,275 | 12/1985 | Goetz | 356/326 |
| 4,617,578 | 10/1986 | Nezu | 346/108 |
| 4,634,232 | 1/1987 | Tateoka | 350/394 |
| 4,686,542 | 8/1987 | Yip et al. | 347/239 |
| 4,743,091 | 5/1988 | Gelbart | 350/352 |
| 4,810,068 | 3/1989 | Shimazu | 350/358 |
| 4,908,506 | 3/1990 | Coops et al. | 250/201.5 |
| 4,960,320 | 10/1990 | Taniura | 350/171 |
| 5,124,829 | 6/1992 | Ishikawa | 359/204 |
| 5,210,635 | 5/1993 | Nagata et al. | 359/198 |
| 5,220,449 | 6/1993 | Kuroda | 359/196 |
| 5,272,715 | 12/1993 | Guerin | 372/98 |
| 5,309,178 | 5/1994 | Gross | 346/108 |
| 5,349,432 | 9/1994 | Elerath | 356/121 |
| 5,469,290 | 11/1995 | Maeda | 347/233 X |
| 5,471,236 | 11/1995 | Ito | 347/238 X |
| 5,475,416 | 12/1995 | Kessler et al. | 347/241 X |
| 5,517,330 | 5/1996 | Maeda | 359/204 X |

FOREIGN PATENT DOCUMENTS 22872 10/1996 Israel .

Primary Examiner—N. Le
Assistant Examiner—Hai C. Pham
Attorney, Agent, or Firm—Ladas & Parry

[57] ABSTRACT

A method and apparatus for delivering laser energy to an object, by: energizing at least one laser energy source having a plurality of at least two spaced, active segments to emit a laser beam from each segment, and to thereby output from the laser energy source a plurality of separate laser beams along respective optical axes initially spaced from each other according to the spacing of the active segments, which beams tend to diverge and thereby to overlap as they progress along their respective optical axes; and at a near-field region of the at least one laser energy source or a region optically conjugative with the near-field region, where the beams are still separated and spaced from each other, laterally displacing the optical axis of at least one of the beams with respect to that of the other before delivering the plurality of beams to the object.

27 Claims, 6 Drawing Sheets

METHOD AND APPARATUS FOR DELIVERING LASER ENERGY TO AN OBJECT

FIELD AND BACKGROUND OF THE INVENTION

The present invention relates to a method and apparatus for delivering laser energy to an object. The invention is particularly useful, and is therefore described below, with respect to applications for recording or/and ablating information, etc., or for producing two or more separated laser beams from diode lasers, e.g., to be used for simultaneous recording.

Diode lasers constitute a preferred laser beam source for many diverse applications, including recording, cutting, ablating, etc., since they have the advantages of compact size, high efficiency, high reliability, and/or manufacturability, as compared to other solid-state and gas laser devices. Laser recording devices employing diode lasers are known in the art. For example, U.S. Pat. No. 5,309,178 discloses a laser recording apparatus including a diode laser, beam compression means, a multichannel acousto-optic modulator, and imaging means for directing the laser energy from the modulator to a laser recording image plane.

Diode lasers, however, have a power density limitation dictated largely by heat removal considerations. These limitations restrict the optical power per unit area that can be generated by the laser. In addition, the divergence of the source is large for a broad area. The limitations of power density and angular divergence substantially limit the source brightness capability of such diode lasers.

As known, a diode laser array with typical dimensions of one micron, by several hundreds or more microns, emits at higher power than corresponding diffraction limited source. However, the length of a single p-n junction is limited by certain thermal conditions, and therefore practical high power diode lasers are often constructed of a plurality of separated active segments aligned in a line.

OBJECTS AND BRIEF SUMMARY OF THE INVENTION

An object of the present invention is to provide a novel method and apparatus for using a near-field pattern of a laser energy source comprised of several spaced active segments, and for providing means for adjusting the distance between the laser beams emitted by the active segments.

According to a broad aspect of the present invention, there is provide a method of delivering laser energy to an object, comprising: energizing a laser energy source having a plurality of at least two spaced, active segments to emit a laser beam from each segment, and to thereby output from the laser energy source a plurality of at least two separate laser beams along respective optical axes initially spaced from each other according to the spacing of the active segments, which beams tend to diverge and thereby to overlap as they progress along their respective optical axes; and at a near-field region of the laser energy source or a region optically conjugative with the near-field region, where the beams are still separated and spaced from each other, laterally displacing the optical axis of at least one of the at least two beams with respect to that of the other of the at least two beams, before delivering the plurality of beams to the object.

According to one application of the above method, the optical axis of the at least one beam is laterally displaced towards that of the other beam to cause the latter beams to combine by joining their edges.

According to another described embodiment, the optical axis of one or both beams is laterally displaced away from, or towards, that of the other beam a fixed predetermined distance. Such a method is particularly useful for interlaced recording on a record medium.

The invention also provides apparatus for delivering laser energy to an object according to the above method.

Further features and advantages of the invention will be apparent from the description below.

BRIEF DESCRIPTION OF THE DRAWINGS

The invention is herein described, by way of example only, with reference to the accompanying drawings, wherein:

FIGS. 1b and 1c are simplified illustrations of near-field and far-field laser beam energy patterns, respectively, of the diode laser of FIG. 1a;

DESCRIPTION OF PREFERRED EMBODIMENTS

Figure 1A:
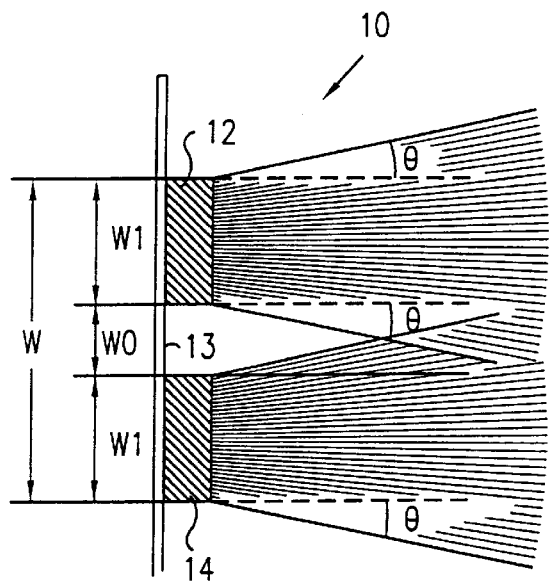
FIG. 1a schematically illustrates a diode laser employed in the device according to the preferred embodiments of the present invention.
Figure 1B:
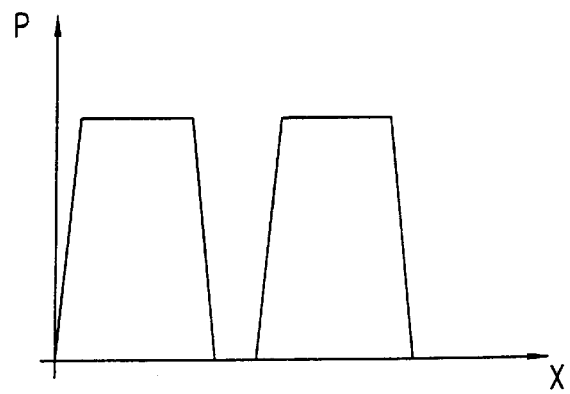
Figure 1C:
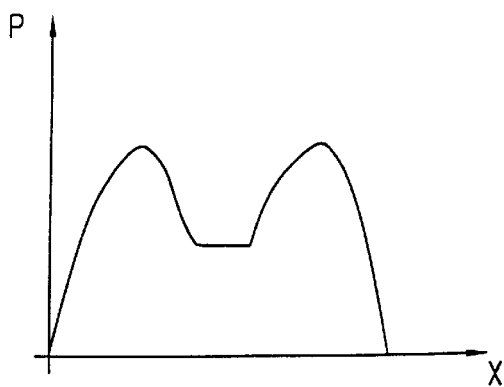

With reference first to FIG. 1a, there is illustrated a diode laser 10 of the type for use in the method and apparatus of the present invention, comprising a plurality of separated active segments arranged in a line. For purposes of explanation, the diode laser 10 illustrated in FIG. 1a comprises two active segments 12, 14, separated by a space 13. FIG. 1b illustrates the near-field pattern of the energy distribution, whereas FIG. 1c illustrates the far-field pattern of the energy distribution. A main disadvantage of such diode laser is a non-uniformity of its far-field pattern in the plane parallel to the junctions, as shown in FIG. 1c. It will be readily understood that employing the diode laser 10 as a laser beam source in the conventional laser recording apparatus described in U.S. Pat. No. 5,309,178, requires compensation for the non-uniform laser beam intensity impinging up on the various channels thereof in order to achieve a relatively flat, uniform optical intensity output of the modulator. This results in considerable waste of energy emitted by the diode laser, more than 25%. Moreover, far-field energy distribution is characterized by its instability according to time, temperature, etc.

Figure 2:
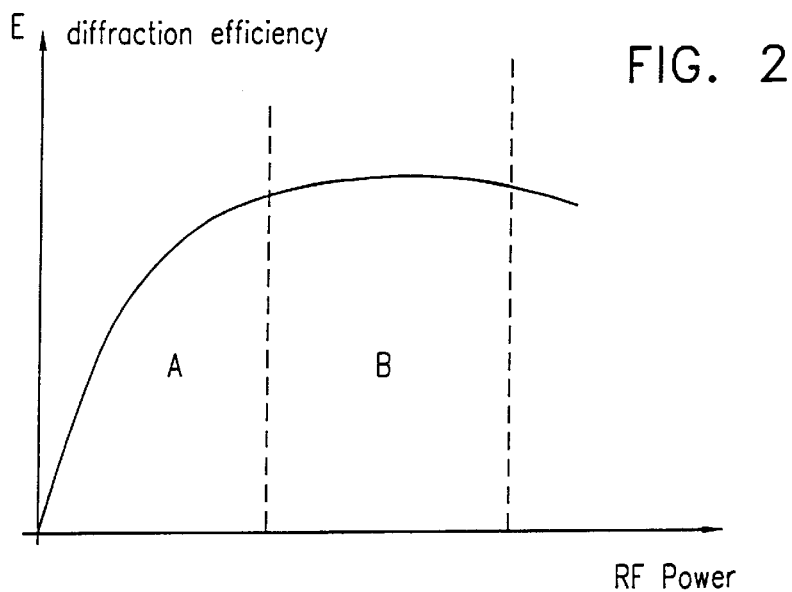
FIG. 2 generally illustrates the diffraction efficiency curve of an acousto-optic modulator as a function of RF power.

FIG. 2 illustrates the diffraction efficiency curve of an acousto-optic modulator, as a function of RF power. Such a curve generally comprises two parts: a linear part A, and a saturation part B. It will be readily understood that in the far-field pattern case (FIG. 1c), the compensating for the non-uniform laser beams intensity impinging upon various channels of the modulator results in that a certain number of channels operate with an efficiency falling within the linear part A of FIG. 2 where such a negative effect as cross-talk between the modulator's channels becomes more significant. Therefore, employing the near-field pattern (FIG. 1b), which is characterized by substantially uniform laser beams intensity, enables operation in the saturation part B of FIG. 2, thereby eliminating the problem associated with the cross-talk effect.

As shown in FIG. 1c, the total effective lasing area in the far-field pattern is equal to the total source area W, which includes the area of the active segments 12 and 14, and also the area of the space 13, that is $W=2W_1+W_0$. While employing a near-field pattern (FIG. 1b) the total effective lasing area becomes smaller, as including only the area of the active segments 12 and 14. Hence, a value of etendue, which is the product of the lasing area with the solid divergence angle of the source, for the far-field case is larger than for the near-field pattern. As known, a smaller value of etendue in the near-field case gives improved conditions for trade-off between focal length on the one hand, and final pixel size and energy density on the other hand. Focal length and final pixel size are important parameters characterizing any laser recording device.

The increase of energy density is important for thermal laser plotters where the data is written directly on a thermal mode film. It is appreciated that employing a near-field pattern in a thermal laser plotter would enable the recording time to be substantially reduced. Indeed, the particular feature of thermal mode film is that the value characterizing its energy sensitivity E decreases, with growth of energy density, while the recording time t is given as:

$$t=(E*S)/P, \qquad \text{(Eq. 1)}$$

wherein P is a light source power, and S is an area of the data written during this period of time.

Figure 3A:
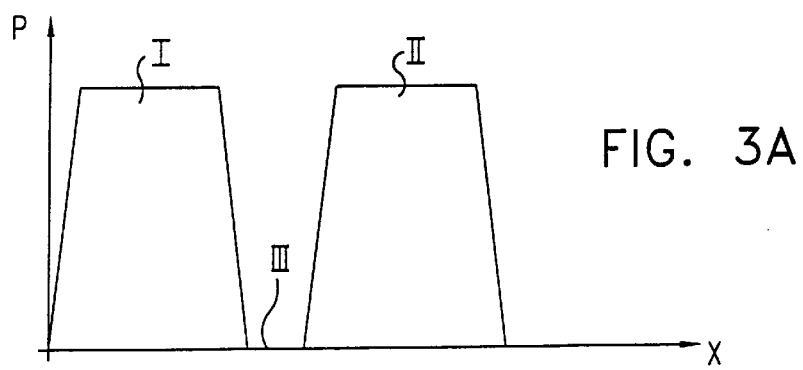
FIG. 3a illustrates the near-field energy distribution of the diode laser in FIG. 1a, and 3b illustrates the recording pattern wherein the near-field energy distribution of the laser is used for recording purposes.
Figure 3B:
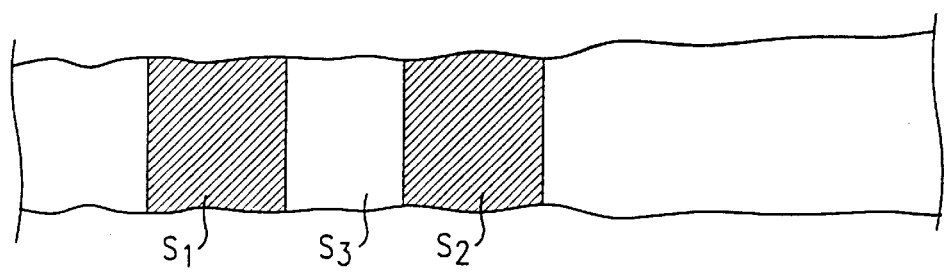

FIG. 3 more specifically illustrates the near-field energy distribution of the diode laser 10, which represents two lobes I and II (of a substantially rectangular shape), separated by a portion III. It is appreciated that directing such beams onto a laser recording image plane, for example in a manner described in the above prior art, results in two parallel slices of written data $S_1$ and $S_2$, leaving between them a slice $S_3$ free of data (FIG. 3b).

Figure 4:
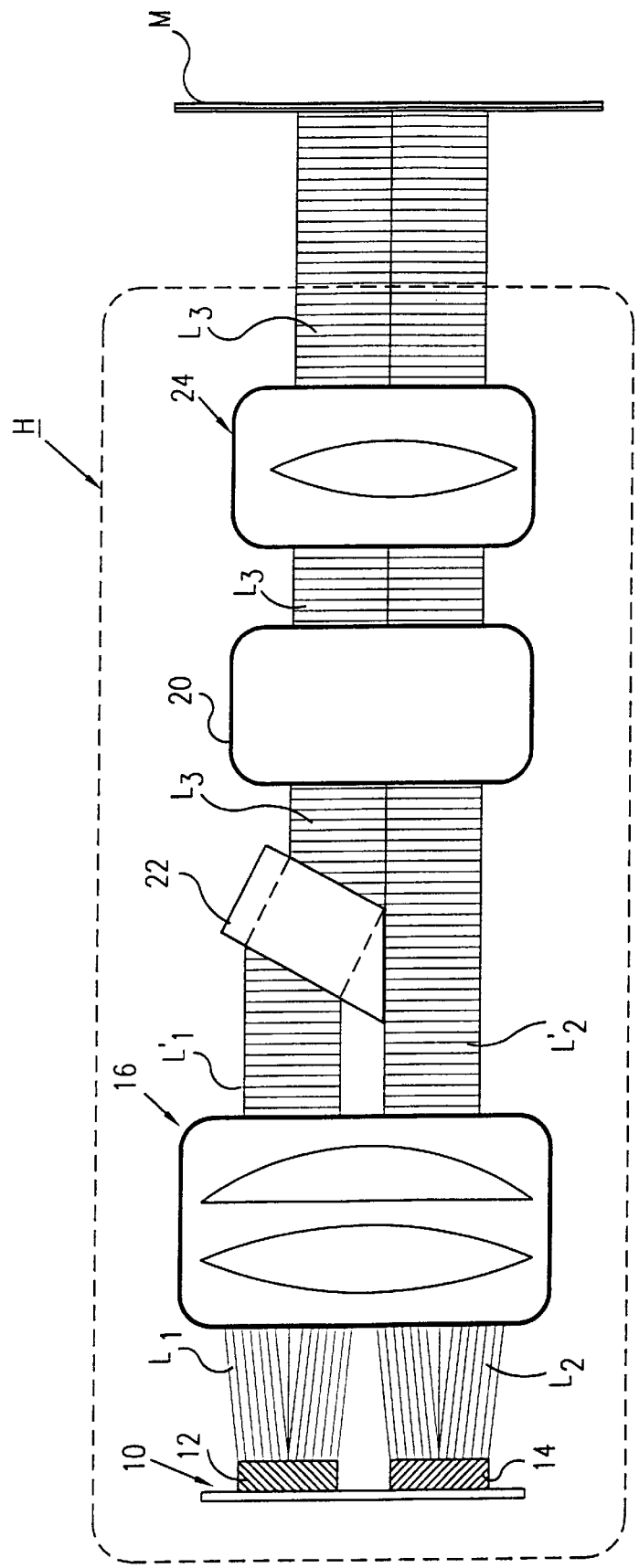
FIG. 4 schematically illustrates the main assemblies of a laser recording device constructed according to one preferred embodiment of the present invention.

FIG. 4 illustrates one preferred embodiment of the present invention, wherein a laser recording device, for example a plotter, comprises an optical head, generally designated H, and an optically-recording medium M, for example a metal-coated thermal film such as the Master Tool 8 commercially available from Agfa Corporation. The recording medium M may be disposed on an internal drum, external drum, or flat bed (not shown).

The optical head H includes the diode laser 10 as a light source, such as a high brightness multimode GaAlAs diode laser Model SDL-2380 commercially available from Spectra Diode Labs of the U.S.A. Its near-field consists of two separated active segments (p/n junctions), designated 12 and 14, aligned in a line. Its segment 12 emits a laser beam $L_1$, and its segment 14 emits a laser beam $L_2$.

Laser beams $L_1$ and $L_2$ then pass through an optical system 16, which typically comprises a collimation lens and an anamorphic optic device, such as a cylindrical lens (or group of lenses), and provides two output beams $L_1'$ and $L_2'$ of desired form. Also provided in the optical head H is a modulator 20, for example the multichannel acousto-optic modulator described in U.S. Pat. No. 5,309,178, and a spherical lens (or group of lenses) 24, which images the modulated light onto the medium M. All these assemblies are well known and are therefore not be described in detail.

One of the particular features of one preferred embodiment of the present invention is the provision of a plane-parallel plate 22, which is located in the optical path of the output beam $L_1$ emerging from the near-field optical system 16. The plane-parallel plate 22 is a conventional one, which provides a parallel lateral displacement of the axis of one laser beam $L_1'$ with respect to the axis of the other laser beam $L_2'$. The plate 22 disposed as illustrated in the example of FIG. 4 displaces beam $L_1'$ towards beam $L_2'$ so that it produces therefrom one combined beam $L_3$.

The combined beam $L_3$ is then fed to the modulator 20, and the modulated output beam is then passed by the spherical lens 24 onto the medium M.

Alternatively, an additional plane-parallel plate (not shown), symmetrically-identical to the plate 22, may be provided in the optical path of the output beam $L_2'$ emerging from the optical system 16 to move it towards beam $L_1'$ to produce the combined beam $L_3$.

It should be noted that, in practice, a plane-parallel plate cannot be manufactured with perfectly right angles, but always comprises a facet. This results in that a small dark region usually remains between the beams $L_1'$ and $L_2'$.

Figure 5A:
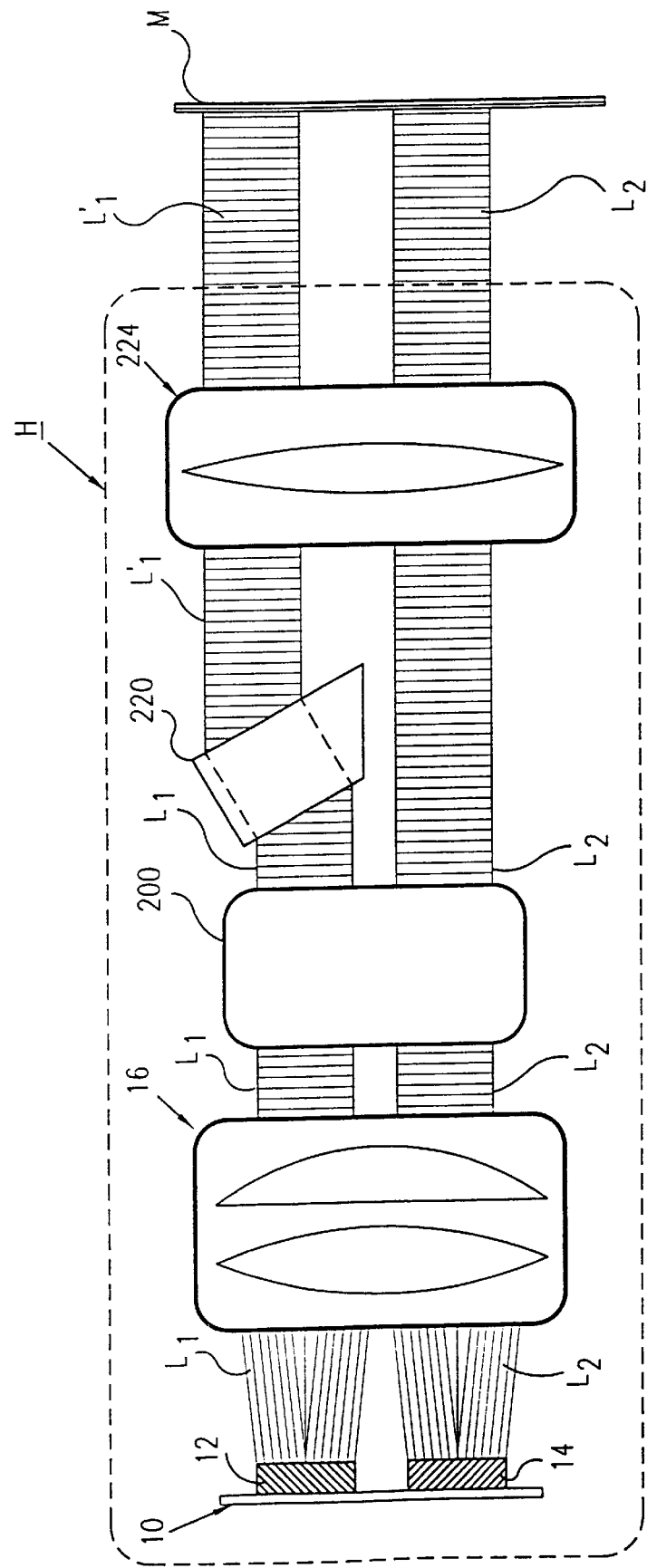
FIGS. 5a and 5b schematically illustrate further preferred embodiments of laser recording devices according to the present invention.
Figure 5B:
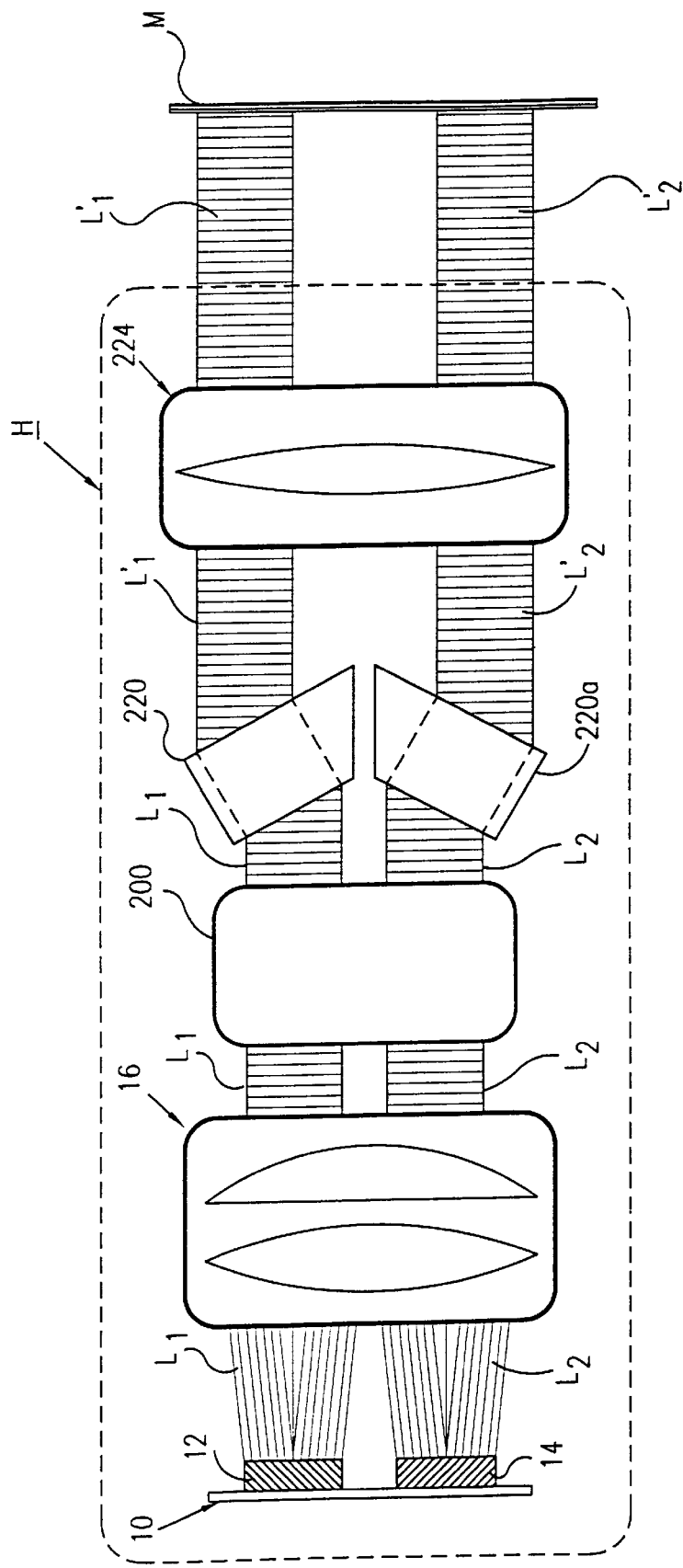

FIGS. 5a and 5b illustrate alternative preferred embodiments of the present invention, wherein the axis of one beam, or the axes of both beams, are moved away from each other a fixed predetermined distance. Such an arrangement is particularly useful to permit simultaneous interlaced recording in two, as illustrated in the present example, or more channels on a record medium.

Thus, FIGS. 5a and 5b illustrate devices which are similar to that of FIG. 4, but which employ a plane-parallel plate 220 (FIG. 5a), or a pair of symmetrically-identical plates 220 and 220a (FIG. 5b) arranged to increase the distance between the beams $L_1$ and $L_2$ emerging from the modulator 200. As shown for example in FIG. 5b, the modulated beam $L_1$ passes through plate 220, while the modulated beam $L_2$ passes through the plate 220a, providing two parallel beams $L_1'$ and $L_2'$. The beams $L_1'$ and $L_2'$ are further imaged by the spherical lens 224 onto the medium M, resulting in simultaneous recording of two separate data channels on the medium M.

The plane-parallel plate 220 (or plates 220 and 220a) could be located in the near-field optical path of the beams emerging from the optical system 16, i.e., before the modulator (as shown in the system of FIG. 4). Preferably, however, the plate/plates are located after the modulator as illustrated in FIGS. 5a and 5b for the purpose of reducing the dimensions of the modulator 200, but still in the near-field range wherein the two laser beams are still separated and, spaced from each other, as illustrated in FIG. 1b.

It will be readily understood that in order to make an interlaced recording process available by simultaneously scanning the medium with two light beams, a predetermined distance between two simultaneously recorded slices should be provided.

The operation of the laser recording device may now be explained with reference to FIGS. 6a–6c.

Figure 6A:
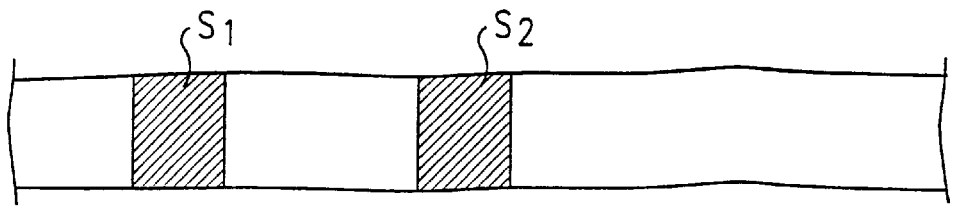
FIGS. 6a–6c generally illustrate three progressive stages of an interlaced recording of the device of FIGS. 5a or 5b.

During the first revolution of the drum (in the case of an outer drum plotter), two parallel slices of the binary data $S_1$ and $S_2$ are simultaneously written onto the recording medium M (FIG. 6a). The displacement of the laser beam $L_1$ (or laser beams $L_1$ and $L_2$) is preferably provided so that:

$$d = 2 \cdot d_1, \quad \text{(Eq. 2)}$$

wherein d is the distance between the recorded slices $S_1$ and $S_2$, $d_1$ is the width of the recorded slice $S_1$ (and $S_2$).

Figure 6B:
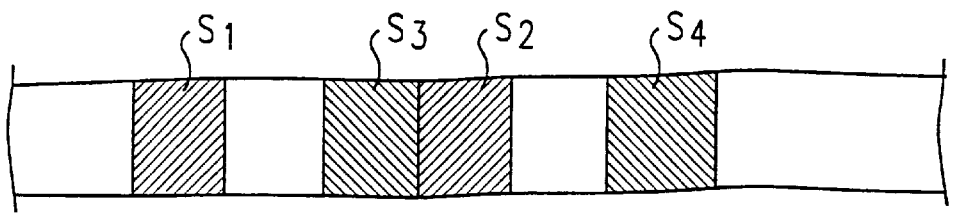
Figure 6C:
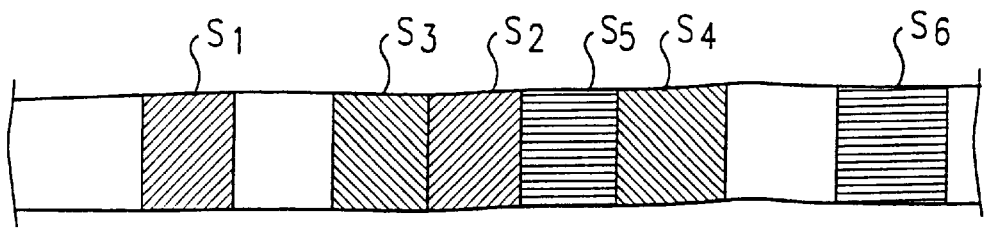

Thus, once the slices $S_1$ and $S_2$ are written, the optical head H is displaced by any suitable means so as to provide binary data slices $S_3$ and $S_4$ to be written during the second revolution of the drum, as shown in FIG. 6b. Further displacement of the optical head H, progressively continuing the scanning of the medium M on the rotatable drum, provides recording of two more additional slices $S_5$ and $S_6$ (FIG. 6c).

Hence, step by step, all the data becomes written onto the medium M in an interlaced manner.

While the invention has been described above with respect to diodes having only two spaced segments emitting laser beams, it will be appreciated that the invention could be applied with respect to diodes having more than two segments. Also, those skilled in the art will readily appreciate that many variations, modifications and changes may be applied to the invention as exemplified in the above description without departing from its scope as defined in and by the appended claims.

What is claimed is:

1. Apparatus for delivering laser energy comprising:
   at least one laser energy source providing at least first and second laser beams extending along respective at least first and second laser beam axes which are generally parallel to each other, said first and second laser beam axes being separated from each other by a first lateral separation distance;
   a first laser beam lateral displacer, laterally displacing said first laser beam such that following displacement thereof it extends along a third laser beam axis, generally parallel to said first laser beam axis and to said second laser beam axis and spaced from said second laser beam axis by a second lateral separation distance different from said first lateral separation distance; and wherein said first laser beam lateral displacer is not impinged by said second laser beam.

2. Apparatus for delivering laser energy according to claim 1 and wherein said laser energy source comprises a laser having first and second laterally spaced active regions.

3. Apparatus for delivering laser energy according to claim 1 and also comprising a collimating lens intermediate said laser energy source and said first laser beam lateral displacer.

4. Apparatus for delivering laser energy according to claim 1 and also comprising:
   a second laser beam lateral displacer, laterally displacing said second laser beam such that following displacement thereof it extends along a fourth laser beam axis, generally parallel to said first laser beam axis and to said second laser beam axis and spaced from said third laser beam axis by a third lateral separation distance different from said first lateral separation distance; and wherein said second laser beam lateral displacer is not impinged by said first laser beam.

5. Apparatus for delivering laser energy according to claim 4 and also comprising an optical modulator for modulating both said first and second laser beams.

6. Apparatus according to claim 4 and wherein said second laser beam lateral displacer is operative to laterally displace said second laser beam without substantially changing the form thereof.

7. Apparatus according to claim 4 and wherein said second laser beam lateral displacer is operative to laterally displace said second laser beam without substantially changing the energy density thereof.

8. Apparatus according to claim 4 operative to deliver said at least first and second laser beams onto a recording medium.

9. Apparatus according to claim 8 and wherein said third lateral separation distance different from said first lateral separation distance is such that said at least first and second laser beams are operative to perform interlaced recording on said recording medium.

10. Apparatus for delivering laser energy according to claim 1 and also comprising an optical modulator for modulating both said first and second laser beams.

11. Apparatus according to claim 1 and wherein said first laser beam lateral displacer is operative to laterally displace said first laser beam without substantially changing the form thereof.

12. Apparatus according to claim 1 and wherein said first laser beam lateral displacer is operative to laterally displace said first laser beam without substantially changing the energy density thereof.

13. Apparatus according to claim 1 operative to deliver said at least first and second laser beams onto a recording medium.

14. Apparatus according to claim 13 and wherein said second lateral separation distance different from said first lateral separation distance is such that said at least first and second laser beams are operative to perform interlaced recording on said recording medium.

15. A method for delivering laser energy comprising:
   providing at least first and second laser beams extending along respective at least first and second laser beam axes which are generally parallel to each other, said first and second laser beam axes being separated from each other by a first lateral separation distance;
   laterally displacing said first laser beam such that following displacement thereof it extends along a third laser beam axis, generally parallel to said first laser beam axis and to said second laser beam axis and spaced from said second laser beam axis by a second lateral separation distance different from said first lateral separation distance; and
   maintaining said second laser beam along said second laser beam axis, substantially without lateral displacement therefrom.

16. The method according to claim 15 and wherein said at least first and second laser beams are collimated by passage through a collimating lens before said first laser beam undergoes lateral displacement.

17. The method according to claim 15 and wherein said first laser beam is laterally displaced without substantially changing the form thereof.

18. The method according to claim 15 and wherein said first laser beam is laterally displaced without substantially changing the energy density thereof.

19. The method according to claim 15 and wherein said at least first and second laser beams are optically modulated by passage through an optical modulator.

20. The method according to claim 15 and wherein said at least first and second laser beams are delivered onto a recording medium.

21. The method according to claim 20 and wherein said second lateral separation distance different from said first lateral separation distance is such that said at least first and second laser beams are operative to perform interlaced recording on said recording medium.

22. A method for delivering laser energy comprising:

providing at least first and second laser beams extending along respective at least first and second laser beam axes which are generally parallel to each other, said first and second laser beam axes being separated from each other by a first lateral separation distance;

laterally displacing said first laser beam such that following displacement thereof it extends along a third laser beam axis, generally parallel to said first laser beam axis and to said second laser beam axis; and laterally displacing said second laser beam such that following displacement thereof it extends along a fourth laser beam axis, generally parallel to said first laser beam axis and to said second laser beam axis and spaced from said third laser beam axis by a lateral separation distance different from said first lateral separation distance.

23. The method according to claim 22 and wherein said second laser beam is laterally displaced without substantially changing the form thereof.

24. The method according to claim 22 and wherein said second laser beam is laterally displaced without substantially changing the energy density thereof.

25. The method according to claim 22 and wherein said at least first and second laser beams are optically modulated by passage through an optical modulator.

26. The method according to claim 22 and wherein said at least first and second laser beams are delivered onto a recording medium.

27. The method according to claim 26 and wherein said lateral separation distance different from said first lateral separation distance is such that said at least first and second laser beams are operative to perform interlaced recording on said recording medium.

* * * * *